United States Patent [19]
Lundell et al.

[11] Patent Number: 5,889,859
[45] Date of Patent: *Mar. 30, 1999

[54] MODULAR HOUSING SYSTEM

[75] Inventors: Louis Lundell, Buffalo Grove; Sang Y. Oh, Schaumburg, both of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 657,877

[22] Filed: May 31, 1996

[51] Int. Cl.⁶ ...................................... H04M 1/00
[52] U.S. Cl. ........................... 379/428; 379/436
[58] Field of Search ...................... 379/428, 429, 379/435, 436, 447, 420, 58, 61

[56] References Cited

U.S. PATENT DOCUMENTS

| | | |
|---|---|---|
| 4,033,081 | 7/1977 | Perkins, Jr. . |
| 4,549,776 | 10/1985 | Isaacs . |
| 4,624,516 | 11/1986 | White . |
| 4,817,127 | 3/1989 | Chamberlin et al. ............ 379/436 |
| 4,939,880 | 7/1990 | Wang . |
| 5,010,565 | 4/1991 | Nash et al. ................ 379/58 |
| 5,203,711 | 4/1993 | Bogiel . |
| 5,414,768 | 5/1995 | McKinnon et al. ............ 379/428 |
| 5,466,057 | 11/1995 | Blankenburg . |

*Primary Examiner*—Jack Chiang
*Attorney, Agent, or Firm*—John J. Oskorep

[57] ABSTRACT

A modular housing system (100) comprises a first housing unit (102), a second housing unit (104), and a clamp (600). The first housing unit (102) has a first bottom wall (610) and a first side wall (108). The second housing unit (104) has a second bottom wall (612) and a second side wall (116). The first housing unit (102) defines a first channel (702) which borders the first side wall (108) and includes an first opening (703) along the first bottom wall (610). The second housing unit (104) defines a second channel which borders the second side wall (116) and includes a second opening along the second bottom wall (612). The clamp (600) has a longitudinally extending U-shape defining a base (800), a first attachment wall (802), and a second attachment wall (804). For optionally attaching the first and second housing units (102, 104), the first attachment wall (802) insertably attaches within the first channel (702) and the second attachment wall (804) insertably attaches within the second channel.

24 Claims, 9 Drawing Sheets

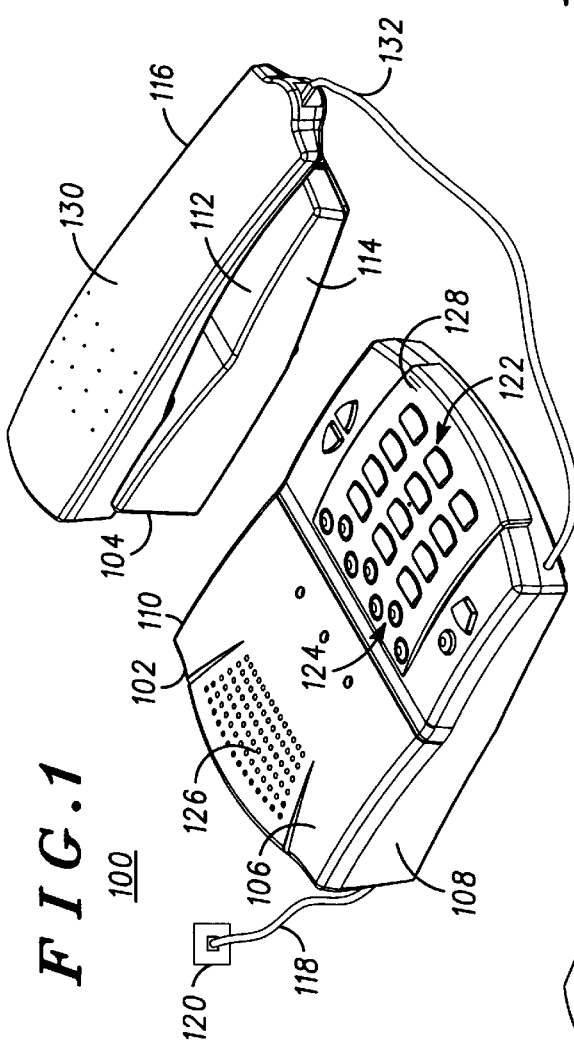
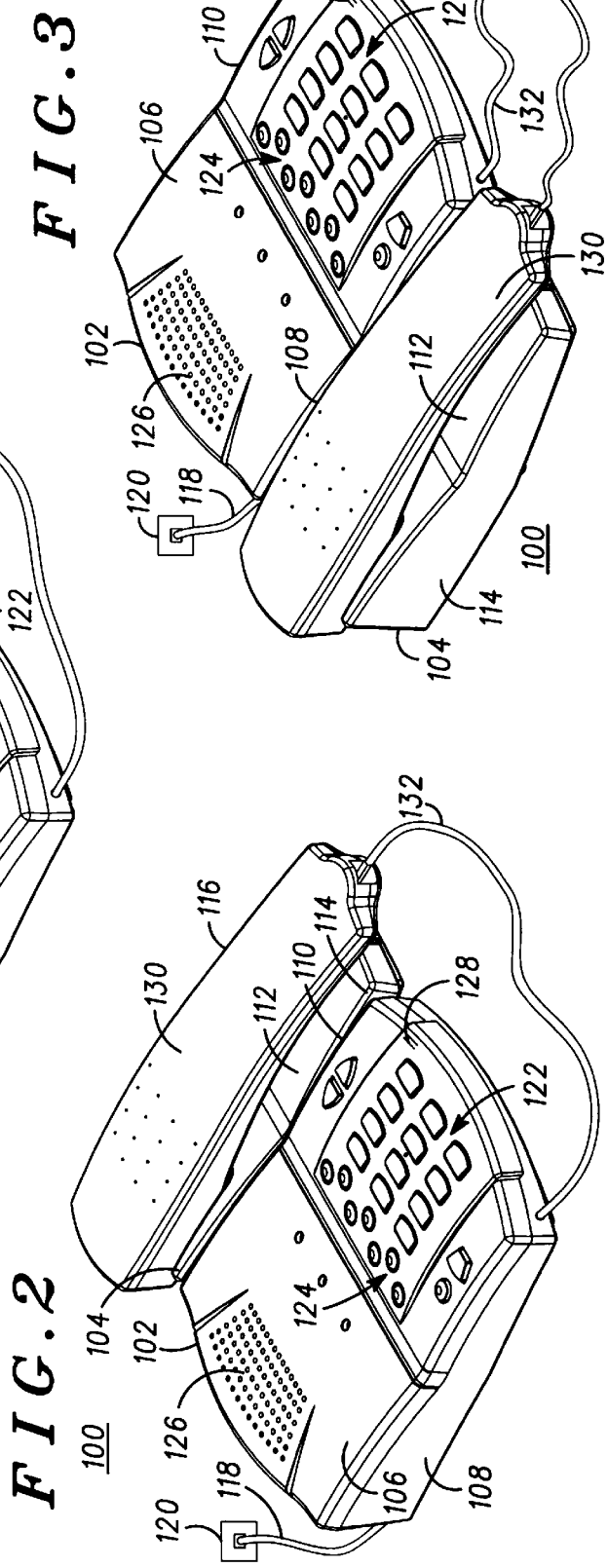

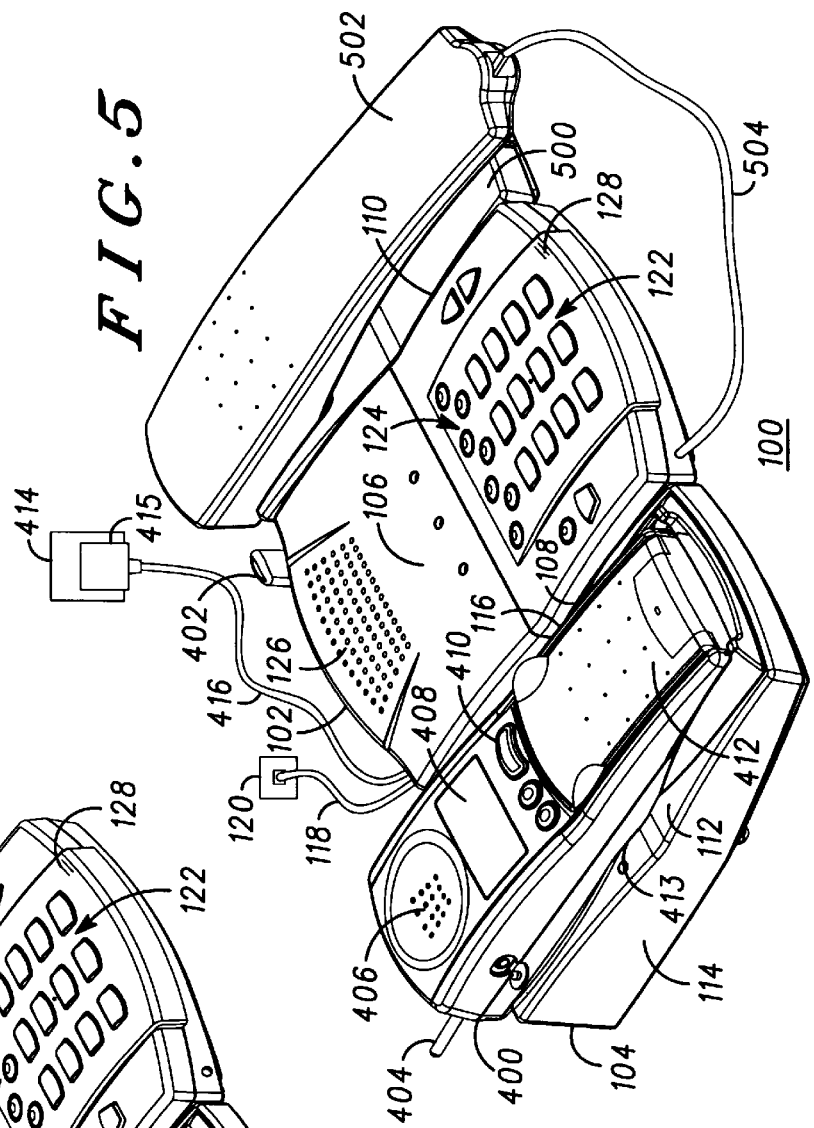
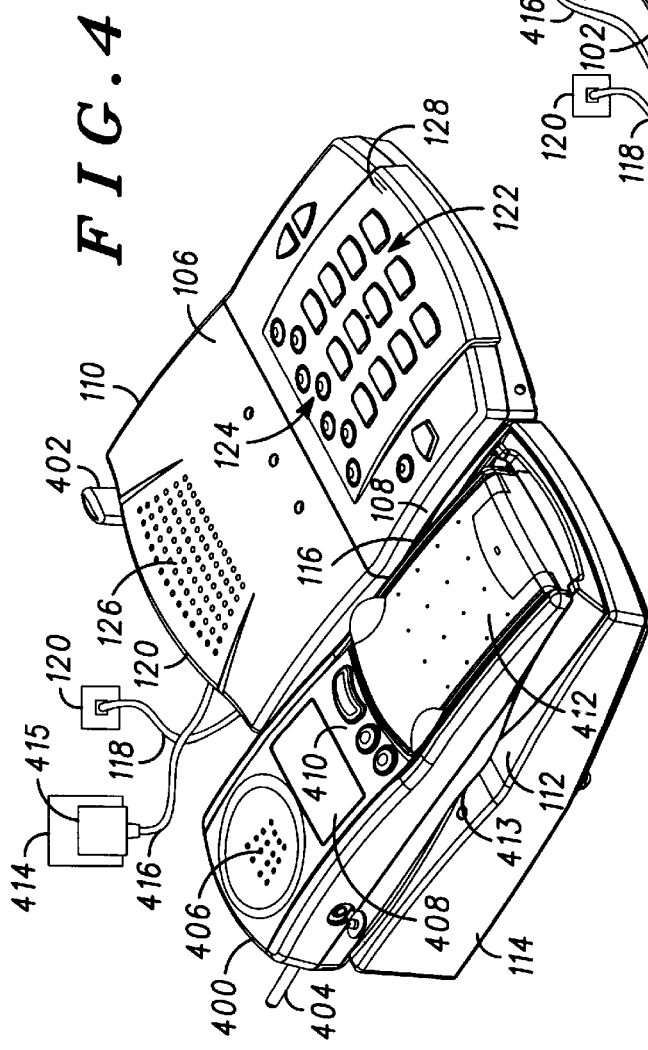

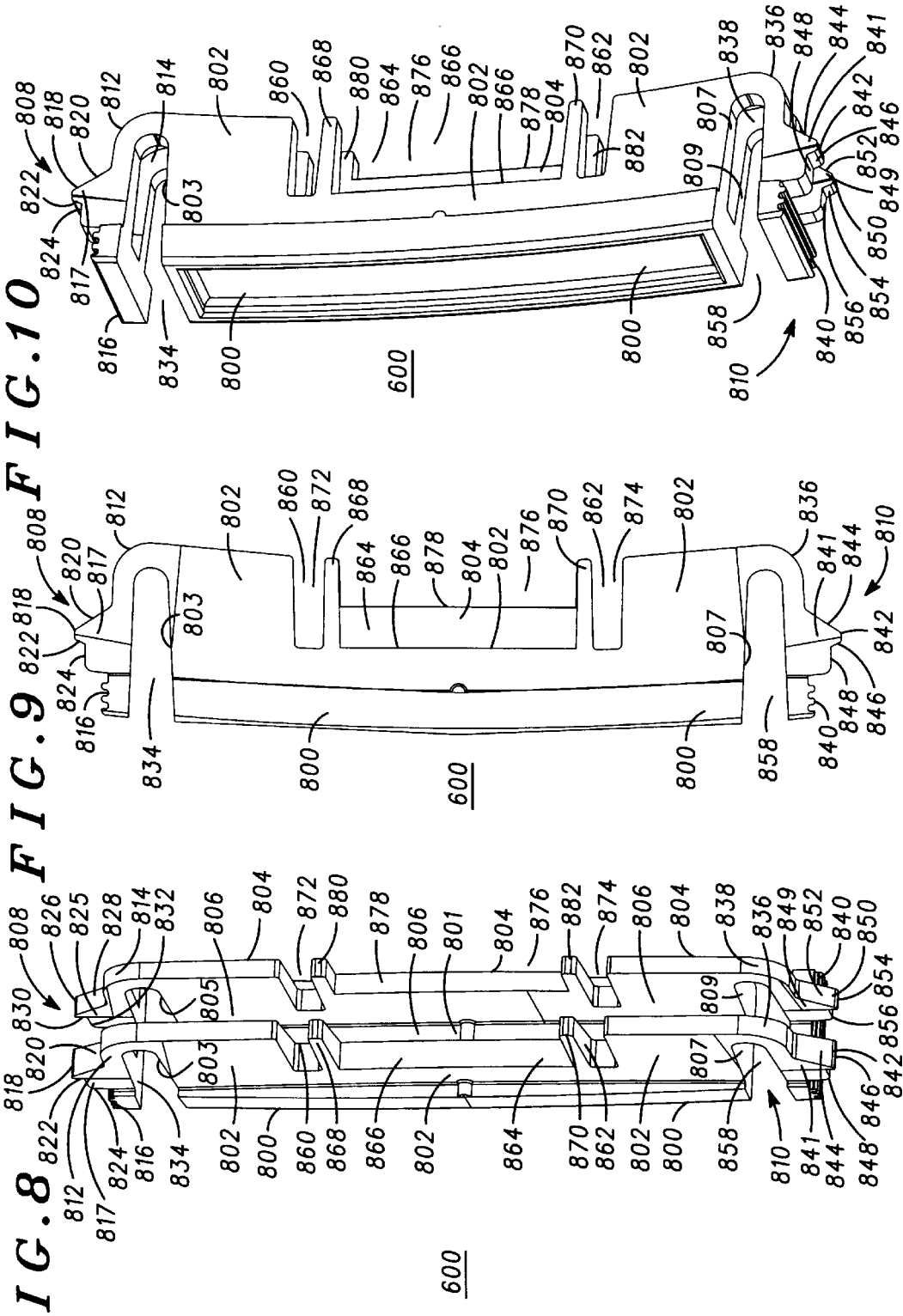

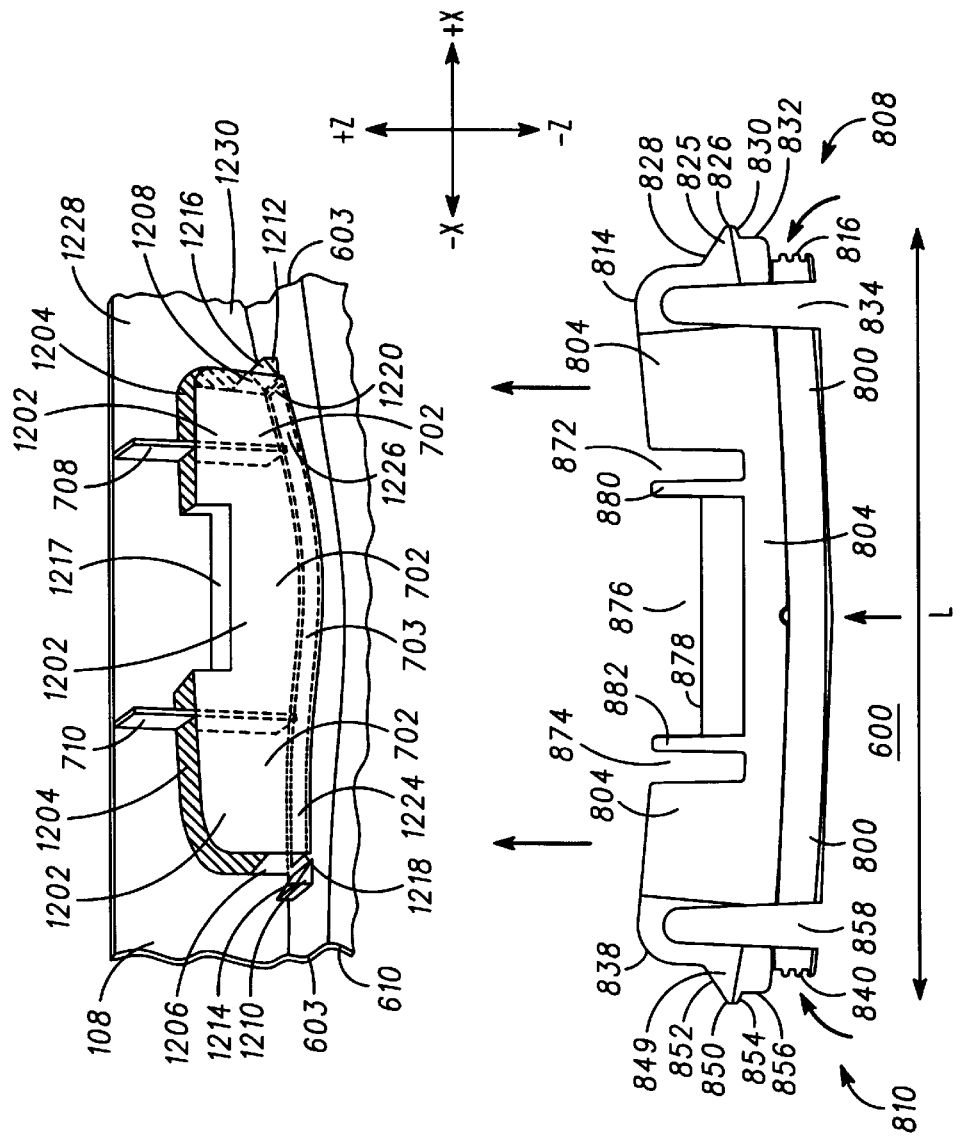
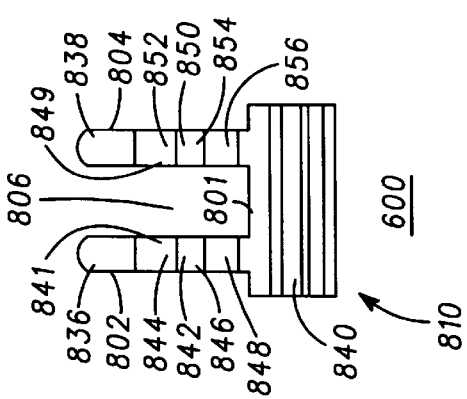

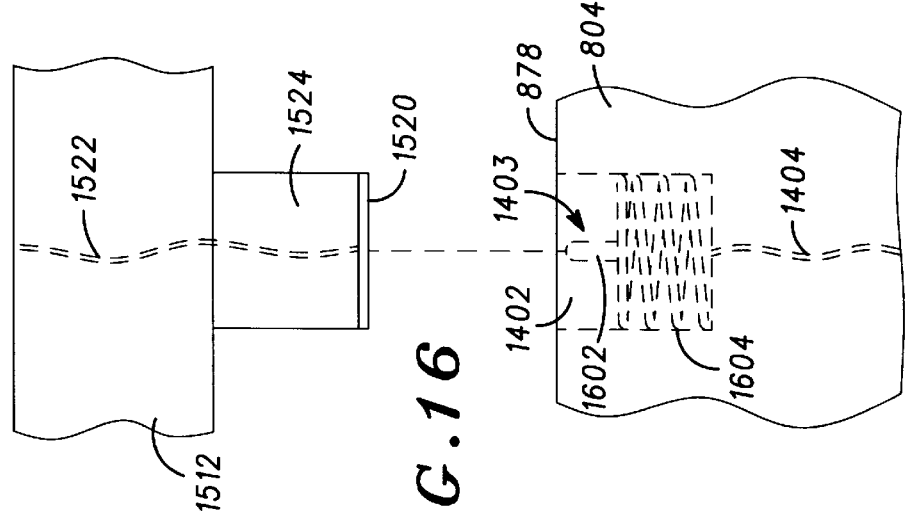
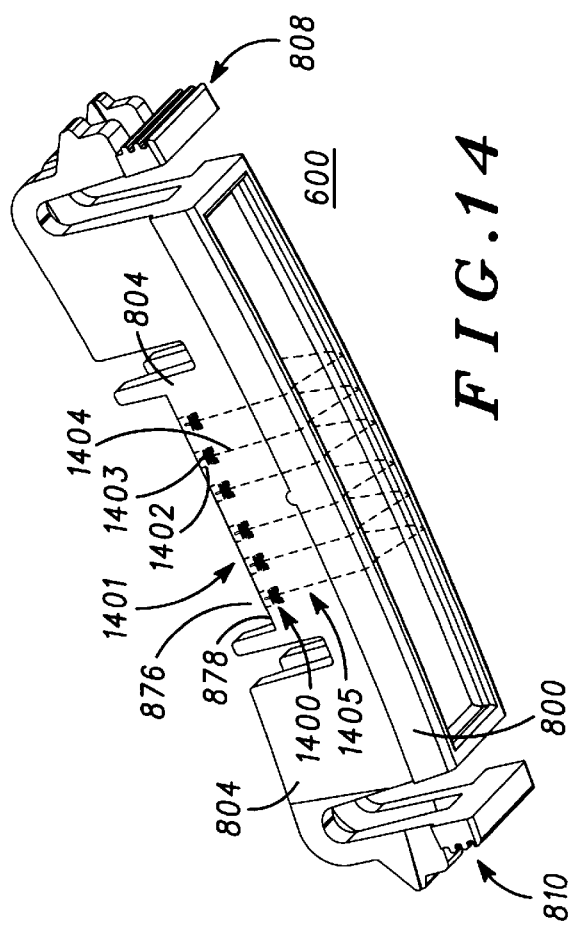
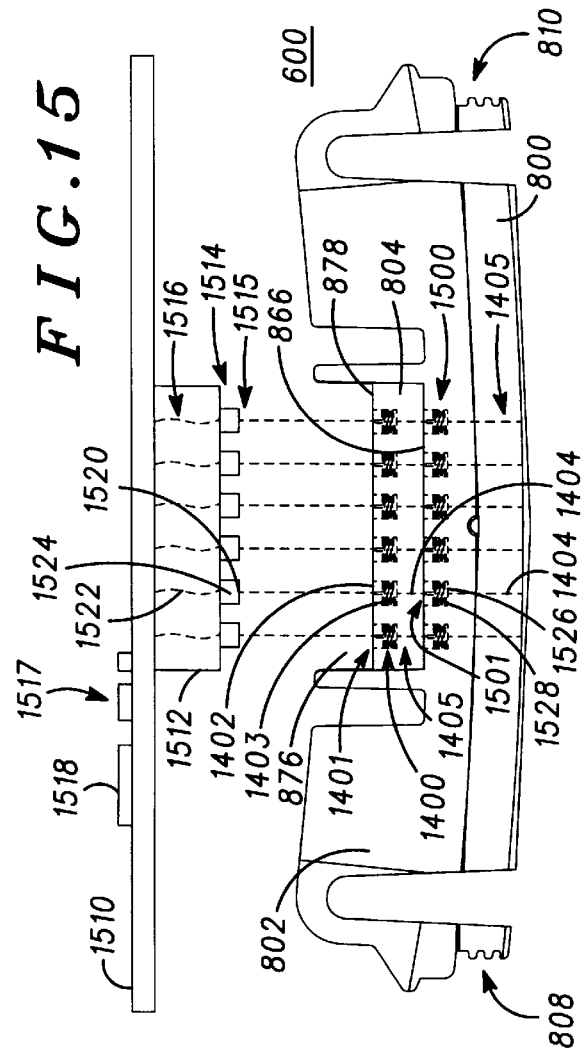

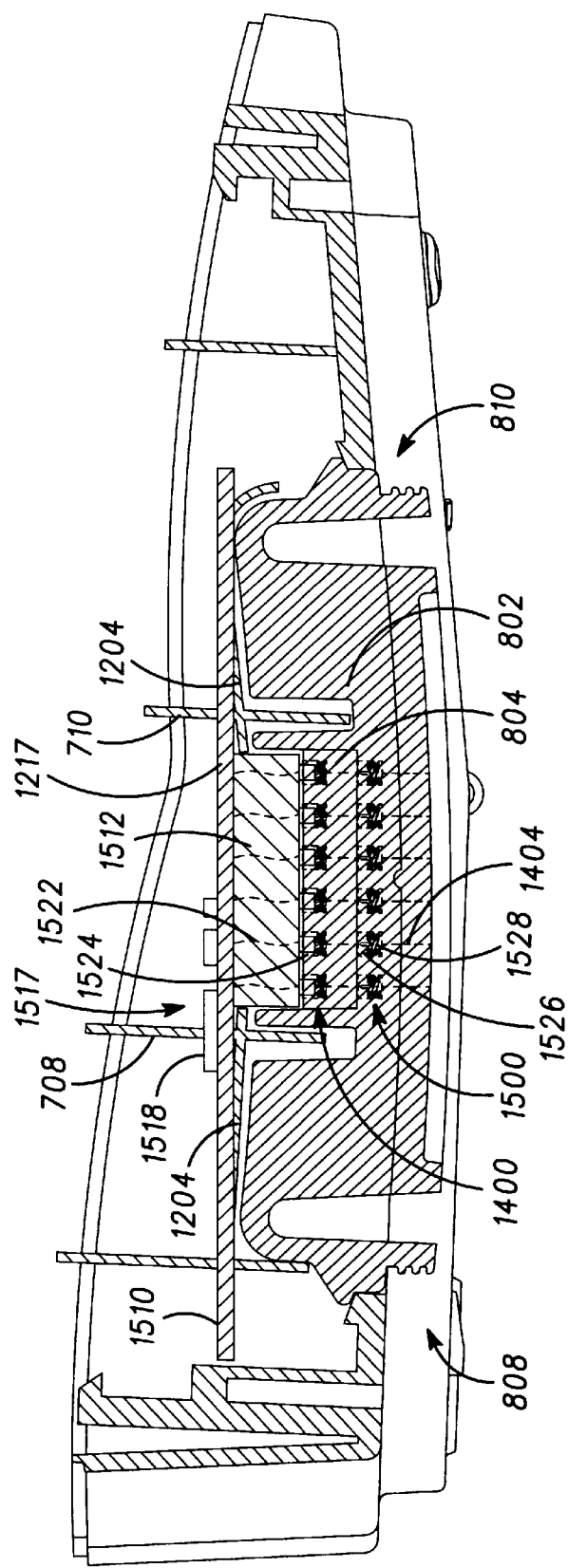

MODULAR HOUSING SYSTEM

FIELD OF THE INVENTION

This invention relates generally to modular housing systems, and more particularly to modular telephone systems.

BACKGROUND OF THE INVENTION

Telephone systems are known. However, such systems typically provide telephone units and features that are fixed or non-extendible. If additional units and features can be added to the system, the additional units may not integrate into the system appropriately from the standpoint of appearance, stability, flexibility, practicality, or safety.

Attachment mechanisms for modular systems are also known. However, a conventional attachment mechanism may detract from the physical appearance of a modular system, especially if modular units of the modular system are left detached. In addition, a conventional attachment mechanism may not provide sufficient attachment strength between the modular units, or may be too complex or too costly.

There is a resulting need for a modular housing system that provides flexibility and practicality, and includes an attachment mechanism that is simple, convenient, durable, and does not detract from the appearance of the modular housing system.

BRIEF DESCRIPTION OF THE DRAWINGS

FIG. 1 is an illustration of a modular housing system which may embody the present invention, the illustration showing housing units of the modular housing system in a detached configuration.

FIG. 2 is an illustration of the modular housing system which shows the housing units in an attached configuration.

FIG. 3 is an illustration of the modular housing system which shows the housing units in an alternate attached configuration.

FIG. 4 is an illustration of the modular housing system which shows the housing units in the attached configuration.

FIG. 5 is an illustration of the modular housing system, as configured in FIG. 4, including an additional housing unit.

FIG. 8 is an illustration showing a first isometric view of a clamp of the modular housing system.

FIG. 9 is an illustration showing a side view of the clamp.

FIG. 10 is an illustration showing a second isometric view of the clamp.

FIG. 11 is an illustration showing an end view of the clamp.

FIG. 12 is an illustration showing a side view of the clamp and an inside portion of the housing unit, the inside portion including a side wall and a channel.

FIG. 14 is an illustration showing a third isometric view of the clamp, where the clamp additionally provides means for electrically coupling electrical circuitry within the housing units.

FIG. 15 is an illustration showing a side view of a printed circuit board of a housing unit and the clamp of FIG. 14.

FIG. 16 is an illustration showing a close-up view an electrical contact of the clamp of FIGS. 14 and 15, and a finger of an electrical connector of the printed circuit board of FIG. 15.

FIG. 17 is an illustration showing a cross-sectional side view of the housing unit and the clamp of FIGS. 14 and 15, where the clamp has a first attachment wall inserted and attached within the housing unit and a second attachment wall positioned outside the housing unit.

DETAILED DESCRIPTION OF THE PREFERRED EMBODIMENTS

Figure 6:
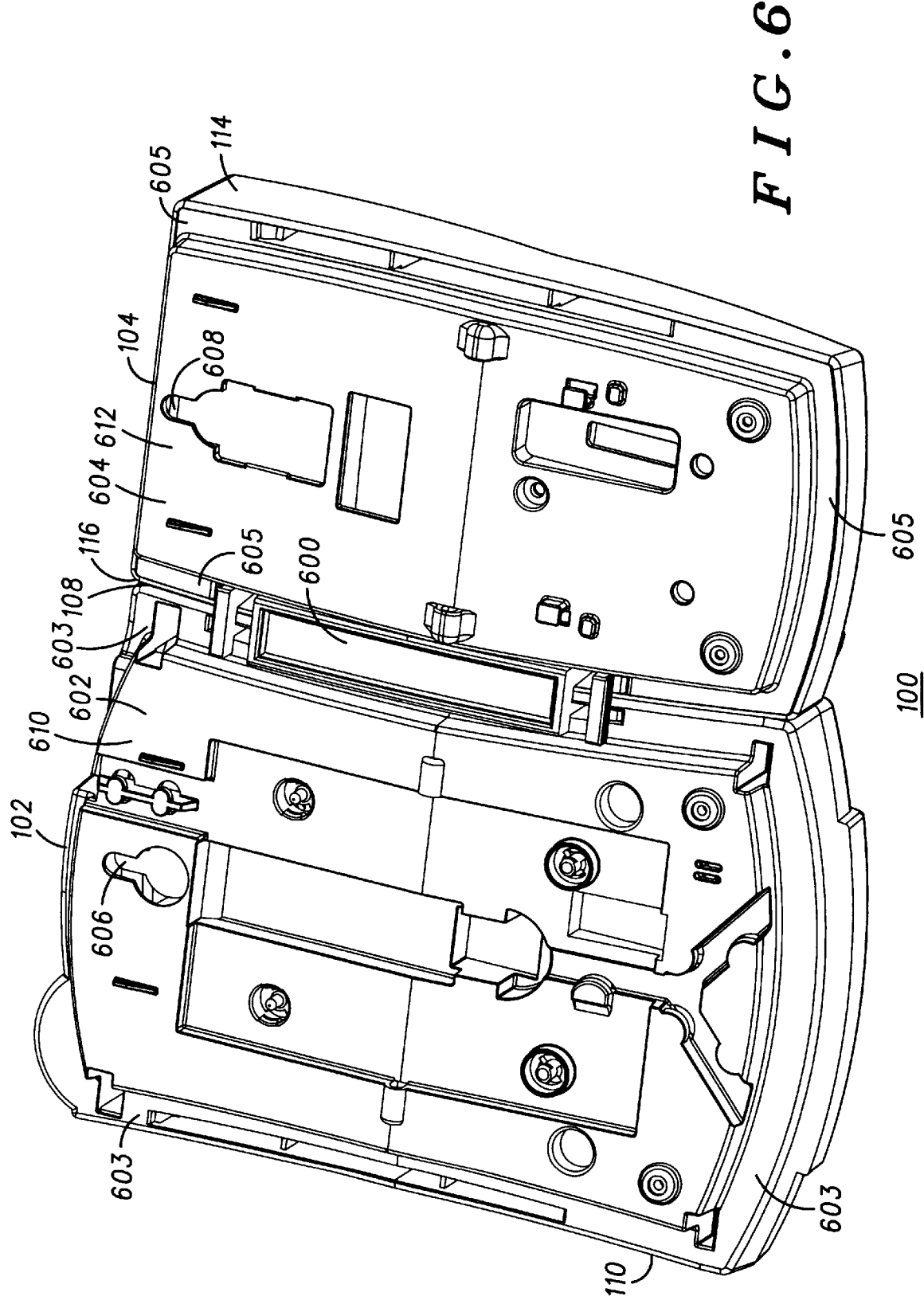
FIG. 6 is an illustration showing a bottom view of the modular housing system as configured in FIG. 3.

According to the present invention, a modular housing system comprises a first housing unit, a second housing unit, and a clamp. The first housing unit has a first bottom wall and a first side wall. The second housing unit has a second bottom wall and a second side wall. The first housing unit defines a first channel which borders the first side wall and includes a first opening along the first bottom wall. The second housing unit defines a second channel which borders the second side wall and has a second opening along the second bottom wall. The clamp has a longitudinally extending U-shape defining a base, a first attachment wall, and a second attachment wall. For optionally attaching the first and second housing units together, the first attachment wall insertably attaches within the first channel and the second attachment wall insertably attaches within the second channel. The clamp may additionally provide electrical coupling between a first electronic component disposed within the first housing unit and a second electronic component disposed within the second housing unit.

FIG. 1 shows a modular housing system 100 which may embody the present invention. Modular housing system 100 comprises a housing unit 102 and a housing unit 104. In FIG. 1, housing units 102 and 104 are detached and shown as separate units. However, housing units 102 and 104 may be attached together as described in detail below. Housing unit 102 includes a top wall 106, a side wall 108, and a side wall 110 (not fully visible). Housing unit 104 includes a top wall 112, a side wall 114, and a side wall 116 (not visible). Side walls 108 and 110 have a slightly inward arcuate shape, whereas side walls 114 and 116 have a slightly outward arcuate shape.

FIG. 2 shows modular housing system 100 with housing units 102 and 104 attached. Here, housing unit 104 is positioned on the right side of housing unit 102. Side walls 110 and 114 are shaped to complement one another when adjoined. That is, the outward arcuate shape of side wall 114 conforms to the inward arcuate shape of side wall 110 when housing units 102 and 104 are attached. Alternatively, as shown in FIG. 3, housing unit 104 is optionally attached and positioned on the left side of housing unit 102. Side walls 108 and 116 are also shaped to complement one another when adjoined.

Modular housing system 100 could provide any utility for a user. In the embodiment shown in FIGS. 1–3, modular housing system 100 is a modular communication system. More specifically, modular housing system 100 is a modular telephone system used for telephone communications. In such a system, housing unit 102 is commonly referred to as a base station, a base unit, or a "base", and housing unit 104 is commonly referred to as a secondary unit, a handset unit, or a "sidecar".

The modularity of modular housing system 100 provides flexibility for a user thereof. For example, a user who is right-handed may prefer the configuration of FIGS. 1 or 2 and a user who is lefthanded may prefer the configuration of FIG. 3. Although housing units 102 and 104 are optionally attachable, side walls 108, 110, 114, and 116 and top walls 106 and 112 are not affected cosmetically. That is, as will be described in further detail below, the attachment options provided do not detract from the physical appearance of modular housing system 100.

In the embodiment shown, housing unit 102 includes electronic circuitry disposed therein for performing telephone communication functions. Since housing unit 102 needs to access at least one telephone land line for a user to place and receive telephone calls, modular housing system 100 includes a telephone cord 118 for connecting to a telephone land line 120. Housing unit 102 may include signaling keys 122, function keys 124, a speaker 126, and a microphone 128. Signaling keys 122 are used to invoke dual tone multiple frequency (DTMF) signaling, signaling which is conventionally used for placing telephone calls.

Function keys 124 may be used to perform a variety of telephone functions. For example, function keys 124 may allow a phone line to be placed "off-hook" or "on-hook," or may allow a phone line to be placed in a speakerphone or "hands-free" mode. The hands-free mode provides telephone communications for a user without requiring the use of a separate telephone handset. Using this feature, speaker 126 provides audio from the phone line to the user and microphone 128 provides an audio input for the user to the phone line.

Housing unit 104 holds a handset 130. Handset 130 includes a microphone and a speaker (not visible) for talking and listening during a telephone call. Handset 130 may also include signaling keys (not visible) for invoking DTMF signaling for placing telephone calls. Modular housing system 100 includes a telephone cord 132 which electrically couples the electrical circuitry of housing unit 102 and the speaker and microphone of handset 130. Since telephone cord 132 is needed, handset 130 is commonly referred to as a corded handset.

As shown in FIG. 4, housing unit 104 may be a cordless handset unit which holds a cordless handset 400. Here, housing unit 102 includes additional electronic circuitry disposed therein and an antenna 402. Cordless handset 400 includes an antenna 404, a speaker 406, a display 408, a keypad 410 (shown in part), and a keypad cover 412. Cordless handset 400 further includes electronic circuitry and batteries disposed therein. The additional electronic circuitry of housing unit 102 and cordless handset 400 are used to perform radio frequency (RF) communications between housing unit 102 and cordless handset 400. RF signals carrying voice and control data are generated within housing unit 102 and cordless handset 400. The RF signals are transmitted and received through antennas 402 and 404. Telephone cord 132 of FIGS. 1–3 is not required if cordless handset 400 is provided and a corded handset is not utilized within modular housing system 100.

Since housing unit 102 includes additional electronic circuitry to perform RF communications, it requires additional electrical power. A source of this electrical power may be an alternating current (AC) power source 414. To receive electrical power from AC power source 414 and transform it into electrical power which can be utilized by housing unit 102, modular housing system 100 is equipped with a plug-in transformer 415 and an electrical cord 416.

The electrical power and the additional electronic circuitry of housing unit 102 may be used to charge the batteries of cordless handset 400. Here, housing unit 104 may be referred to as a charging unit. Cordless handset 400 has a bottom wall 413 which has electrical contacts (not visible) disposed thereon and electrically coupled to the batteries within cordless handset 400. Housing unit 104 also includes electrical contacts (not visible) on top wall 112 located underneath cordless handset 400. When cordless handset 400 is placed within housing unit 104, the electrical contacts on top wall 112 make electrical contact with the electrical contacts of bottom wall 413. Since the electrical contacts on top wall 112 may be electrically coupled to the additional electronic circuitry of housing unit 102, the batteries of cordless handset 400 may be charged by the electrical power provided to housing unit 102 via AC power source 414. The aforementioned electronic coupling between housing units 102 and 104 is described in detail below and provided when housing units 102 and 104 are attached. When housing units 102 and 104 are detached, as optionally provided, and therefore not electrically coupled, housing unit 104 may be provided with an alternate plug-in transformer and electrical cord similar to that of plug-in transformer 415 and electrical cord 416. The alternate plug-in transformer and electrical cord may be plugged into AC power source 414 and housing unit 104 to charge the batteries of cordless handset 400.

Modular housing system 100 may include additional housing units that provide additional attachment options. A user may attach these additional housing units to modular housing system 100 in accordance with his or her preferences. For example, FIG. 5 shows the configuration of FIG. 4 having a housing unit 500 positioned on the right side of housing unit 102 and attached thereto. Housing unit 500 carries a handset 502 and includes a telephone cord 504. Other housing units may be further attached or "daisy-chained" to modular housing system 100 as desired. Other housing units available for modular housing system 100 include, but are not limited to, an answering machine unit and a caller-ID unit. Such housing units may be sold together or separately with modular housing system 100.

FIG. 6 shows a bottom view of modular housing system 100 as it is arranged in FIG. 3. Modular housing system 100 includes housing unit 102, housing unit 104, and a clamp 600. Housing unit 102 is shown having a bottom wall 610 including a lower portion 602 and an upper portion 603. Similarly, housing unit 104 is shown having a bottom wall 612 including a lower portion 604 and an upper portion 605. Slots 606 and 608 are integrally formed on bottom walls 610 and 612 respectively. More particularly, slots 606 and 608 are formed on lower portions 602 and 604 respectively. Slots 606 and 608 provide a means for hanging modular housing system 100 upon a vertical surface, where hanging pins (not shown) are inserted within slots 606 and 608. If housing units 102 and 104 are detached as shown in FIG. 1, one of housing units 102 and 104 may be hung on a vertical surface while the other rests upon a horizontal surface.

Lower portions 602 and 604 and upper portions 603 and 605 are substantially planar. Lower portions 602 and 604 are raised in planes that are higher than and substantially parallel to upper portions 603 and 605 respectively. Upper portion 603 runs adjacent to side walls 108 and 110. Similarly, upper portion 605 runs adjacent to side walls 114 and 116. When modular housing system 100 is placed upon a surface for standard operation (for example, see FIGS. 1–5), where bottom walls 610 and 612 face the surface, lower portions 602 and 604 touch and rest upon the surface whereas upper portions 603 and 605 are elevated above the surface.

Housing units 102 and 104 are attached by clamp 600. Clamp 600 is inserted through bottom walls 610 and 612. More specifically, clamp 600 is inserted through upper portions 603 and 605. Given the size of clamp 600 and the elevation differences between upper portions 603 and 605 and lower portions 602 and 604, when modular housing system 100 is placed upon a surface for standard operation (again, for example, see FIGS. 1–5), lower portions 602 and 604 touch and rest upon the surface whereas clamp 600 is elevated above the surface. Therefore, although clamp 600 is attached along bottom walls 610 and 612, clamp 600 does not effect the physical stability of modular housing system 100. In addition, since bottom walls 610 and 612 are placed on a horizontal or vertical surface when modular housing system 100 is used, the placement of clamp 600 does not detract from the appearance of modular housing system 100. That is, no attachment mechanism or feature is shown along top walls 106 and 112 or side walls 110 and 114.

Figure 7:
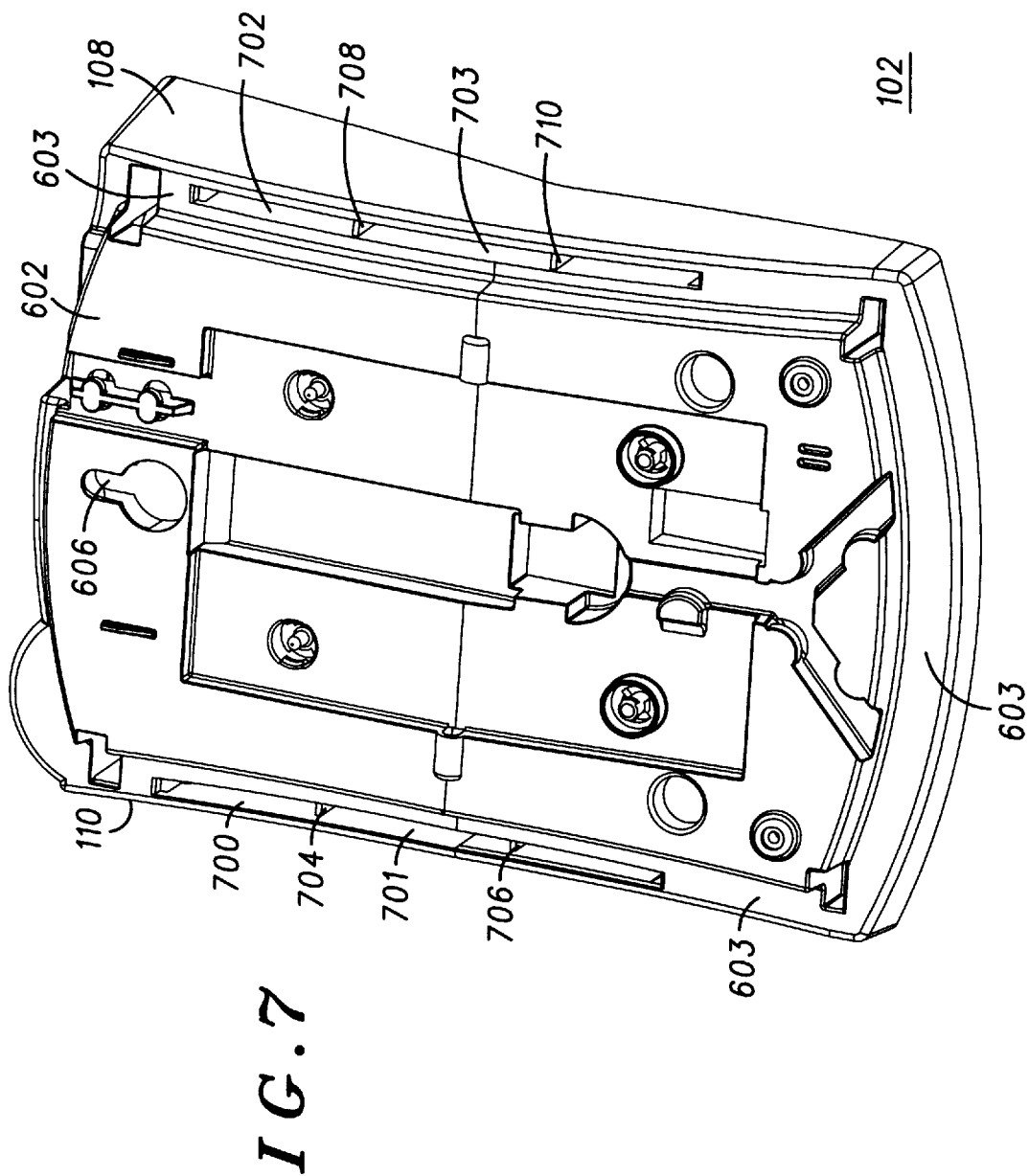
FIG. 7 is an illustration showing a bottom view of one of the housing units.

FIG. 7 shows a bottom view of housing unit 102. Housing unit 102 includes channels 700 and 702 molded therein. Bottom wall 610 includes an opening 701 to channel 700. Similarly, bottom wall 610 includes an opening 703 to channel 702. Channel 700 borders side wall 110 and channel 702 borders side wall 108. Channels 700 and 702 are substantially rectangular in shape, but have a slight inward arcuate shape similar to that of side walls 108 and 110. Channel 700 includes ribs 704 and 706. Similarly, channel 702 includes ribs 708 and 710. Similar to housing unit 102, housing unit 104 includes channels on bottom wall 612 (similar to channels 700 and 702 of bottom wall 610) which border side walls 114 and 116.

FIGS. 8, 9, 10, and 11 show clamp 600 in greater detail. Clamp 600 has a longitudinally extending U-shape defining a base 800, an attachment wall 802, and an attachment wall 804. Attachment walls 802 and 804 outwardly extend from base 800 and define a clamp channel 806 positioned therebetween. Base 800 has a bottom surface 801 which defines a bottom of clamp channel 806. Attachment walls 802 and 804 are substantially planar, although both have a slight arcuate shape conforming to the arcuate shape of channel 702, and are positioned parallel to one another. Attachment wall 802 has a top side 866 and end sides 803 and 807. Similarly, attachment wall 804 has a top side 878 and end sides 805 and 809.

Clamp 600 also includes ends 808 and 810 which are inwardly flexible. Clamp 600, and housing units 102 and 104, are preferably manufactured from a plastic material which allows some flexibility. End 808 includes an arm 812 and an arm 814. Arm 812 perpendicularly extends from end side 803 and thereafter perpendicularly bends to run parallel to end side 803. Similarly, arm 814 perpendicularly extends from end side 805 and thereafter perpendicularly bends to run parallel to end side 805. Arms 812 and 814 are integrally attached together by a button portion 816. Arms 812 and 814 are structured and positioned to define a gap 834 between end sides 803 and 805 and arms 812 and 814. Arms 812 and 814 are flexible and, given gap 834, bend inwardly in response to a force applied to button portion 816 in a direction towards end sides 803 and 805.

Arm 812 includes a nose portion 817 which outwardly extends therefrom. Similarly, arm 814 includes a nose portion 825 which outwardly extends therefrom. Nose portion 817 includes a nose top 820, a nose tip 818, and a nose bottom 822. Similarly, nose portion 825 includes a nose top 828, a nose tip 826, and a nose bottom 830. Arm 812 includes an end side 824 which is positioned below nose portion 817. Similarly, arm 814 includes an end side 832 which is positioned below nose portion 825. Given gap 834 and the flexibility of arms 812 and 814, arms 812 and 814 inwardly bend in response to a force applied to nose tops 820 and 828 in a direction substantially perpendicular thereto.

End 810 has an arrangement similar to end 808. End 810 includes an arm 836 and an arm 838. Arm 836 perpendicularly extends from end side 807 and thereafter perpendicularly bends to run parallel to end side 807. Similarly, arm 838 perpendicularly extends from end side 809 and thereafter perpendicularly bends to run parallel to end side 809. Arms 836 and 838 are integrally attached together by a button portion 840. Arms 836 and 838 are structured and positioned to define a gap 858 between end sides 807 and 809 and arms 836 and 838.

Arm 836 includes a nose portion 841 which outwardly extends therefrom. Similarly, arm 838 includes a nose portion 849 which outwardly extends therefrom. Nose portion 841 includes a nose top 844, a nose tip 842, and a nose bottom 846. Similarly, nose portion 849 includes a nose top 852, a nose tip 850, and a nose bottom 854. Arm 836 includes an end side 848 which is positioned below nose portion 842 and arm 838 includes an end side 856 which is positioned below nose portion 849. Given gap 858 and the flexibility of arms 836 and 838, arms 836 and 838 inwardly bend in response to a force applied to button portion 840 in a direction towards end sides 807 and 809, or in response to a force applied to nose tops 844 and 852 in a direction substantially perpendicular thereto.

Attachment wall 802 includes notches 860, 862, and 864. Similarly, attachment wall 804 includes notches 872, 874, and 876. Notches 864 and 876 are positioned in the centers of attachment walls 802 and 804 respectively. Notch 860 is positioned adjacent to notch 864 and end 808, and notch 862 is positioned adjacent to notch 864 and end 810. Similarly, notch 872 is positioned adjacent to notch 876 and end 808, and notch 874 is positioned adjacent to notch 876 and end 810. Fingers 868 and 870 are defined along attachment wall 802 from notches 860 and 864 and from notches 862 and 864 respectively. Similarly, fingers 880 and 882 are defined along attachment wall 804 from notches 872 and 876 and from notches 874 and 876 respectively.

FIG. 12 shows a side view of clamp 600 and of an inside portion of housing unit 102 including side wall 108. Clamp 600 includes attachment wall 804 for insertably attaching within channel 702. Attachment wall 804 is sized to fit channel 702. Bottom wall 610 has a channel edge 1218 defining a first end 1224 of channel 702 and a channel edge 1220 defining a second end 1226 of channel 702. Channel 702 is further defined by side wall 108, a side wall 1202, and a top wall 1204. Side wall 1202 is positioned parallel to side wall 108 and is integrally attached thereto via top wall 1204. Top wall 1204 includes openings 1206, 1208, and 1217. Opening 1206 is located at first end 1224 near channel edge 1218. Similarly, opening 1208 is located at second end 1226 near channel edge 1220.

Ribs 708 and 710 are integrally attached to side walls 108 and 1202 for providing support thereto. Ribs 708 and 710 extend through channel 702 from a top portion 1228 of side wall 108 to a bottom portion 1230 of side wall 108. Without ribs 708 and 710, side walls 108 and 1202 are prone to bend inwardly towards each other (possibly permanently deforming in such a position) when subject to a mechanical stress. Opening 1217 is located between ribs 708 and 710. A nub 1210 is provided on the inside of bottom wall 610 adjacent to channel edge 1218. Similarly, a nub 1212 is provided on the inside of bottom wall 610 adjacent to channel edge 1220.

Nubs 1210 and 1212 have surfaces 1214 and 1216 respectively, which slope downwardly towards opening 703.

In the preferred embodiment, the length of clamp 600 is made slightly larger than the length of opening 703, and therefore the flexibility of arms 812, 814, 836, and 838 is needed for insertion of attachment wall 804 into channel 702. Attachment wall 804 may be attached within channel 702 by inwardly pressing button portions 816 and 840, inserting attachment wall 804 through opening 703, and releasing button portions 816 and 840 to thereby "lock" attachment wall 804 into channel 702.

Figure 13:
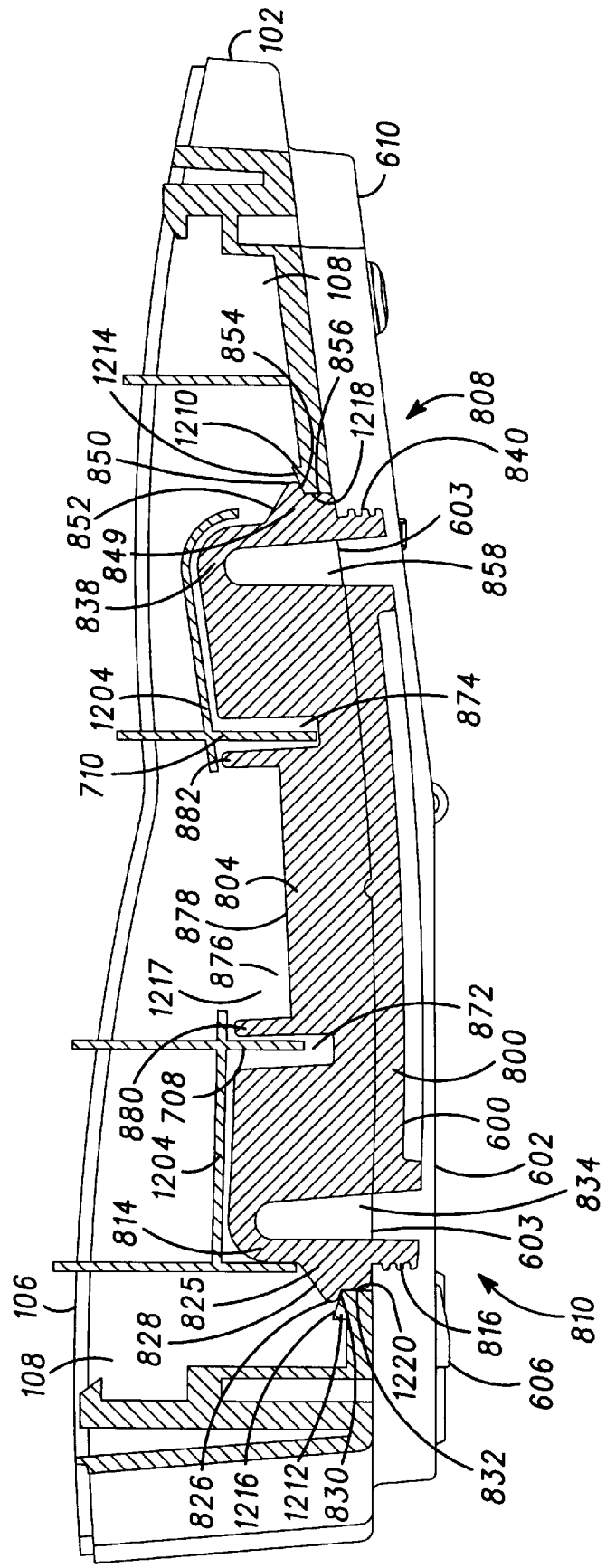
FIG. 13 is an illustration showing a cross-sectional side view of the housing unit and the clamp, where the clamp has an attachment wall inserted and attached within the channel of the housing unit.

FIG. 13 is a cross-sectional side view of housing unit 102 and clamp 600, where housing unit 102 is shown having attachment wall 804 fully inserted and attached within channel 702. FIG. 13 is a view from the outside of housing unit 102, as opposed to the inside view shown in FIG. 12. When button portions 816 and 840 are released after insertion of attachment wall 804, arms 812, 814, 836, and 838 flex outwardly. Surfaces 1214 and 1216 engage nose bottoms 854 and 830 respectively, and end sides 856 and 832 may abut channel edges 1218 and 1220 respectively. Ribs 708 and 710 are disposed within notches 872 and 874 respectively. Top side 878 is exposed through opening 1217. When fully inserted, base 800 extends beyond upper portion 603 but not beyond bottom portion 602.

Referring back to FIG. 12, attachment wall 804 may be attached within channel 702 using an alternate method of insertion. Attachment may be accomplished by inserting only a portion of attachment wall 804 (near one of ends 808 and 810) into opening 703 and subsequently pressing base 800 towards channel 702. The pressing of base 800 inserts the remaining portion of attachment wall 804 into channel 702, where one of ends 808 and 810 flexes inwardly around one of channel edges 1218 and 1220 respectively, and then flexes outwardly to lock attachment wall 804 into place. To illustrate, a user may insert a portion of attachment wall 804, with end 808 in first, within end 1226 of channel 702. Here, end side 832 abuts channel edge 1220 and nose bottom 830 engages surface 1216 while end 810 is positioned outside channel 702. Next, base 800 is forced in a direction toward channel 702. Here, channel edge 1218 and nose top 852 meet and an opposing force of channel edge 1218 to nose top 852 forces arms 836 and 838 to bend inwardly. Force is applied to base 800 until nose tip 850 meets and overcomes channel edge 1218. Thereafter, arms 836 and 838 flex outwardly where surface 1214 engages nose bottom 854 and end side 856 may abut channel edge 1218. Attachment wall 804 is thereby attached or locked within channel 702 as shown in FIG. 13.

As stated above, housing unit 104 (FIG. 6) includes channels similar to channels 700 and 702. Clamp 600 secures and attaches housing units 102 and 104 together when attachment wall 802 is additionally inserted into such a channel of housing unit 104. Using the methods described above, clamp 600 may be inserted into both housing units 102 and 104 simultaneously when side walls 108 and 116 are aligned prior to insertion of clamp 600. Likewise, when side walls 110 and 114 are aligned, clamp 600 may attach housing units 102 and 104 together. For attaching additional housing units to modular housing system 100 (for example, FIG. 5), additional clamps are provided.

Clamp 600 may be detached from housing units 102 and 104 by simultaneously pressing inwardly button portions 816 and 840 and pulling outwardly clamp 600 away from housing units 102 and 104. Alternatively, clamp 600 may be detached by pressing inwardly only one of button portions 816 and 840, thus disengaging one of ends 808 and 810, and subsequently pulling clamp 600 away from and out of housing units 102 and 104. When attached, clamp 600 is held securely within housing units 102 and 104. Any attempt to remove clamp 600 from housing units 102 and 104 without the use of button portions 816 and 840 is difficult since ends 808 and 810 are engaged securely within the channels of housing units 102 and 104. Since attachment walls 802 and 804 are sized to insert deeply within housing units 102 and 104 (along a substantial height of side walls 108 and 116), clamp 600 securely joins housing units 102 and 104.

In addition to attaching housing units 102 and 104, clamp 600 may electrically couple the electrical circuitry of housing units 102 and 104. This may be desirable, for example, where the electrical circuitry of housing unit 102 is powered by AC power source 414 and housing unit 104 is a charging unit as described above (FIGS. 4 and 5).

FIG. 14 shows clamp 600 having electrical contacts 1400. Electrical contacts 1400 are disposed within bores 1401 positioned along top side 878. Similarly, as shown in FIG. 15, clamp 600 has electrical contacts 1500 disposed within bores 1501 positioned along top side 866. Electrical conductors 1405 are disposed within and extend through attachment wall 804, base 800, and attachment wall 802. In the embodiment shown, each one of electrical contacts 1400 is electrically coupled to only one of electrical contacts 1500 via one of electrical conductors 1405. For example, one of electrical contacts 1400 is an electrical contact 1403, which is disposed within a bore 1402 (one of bores 1401 along top side 878). One of electrical contacts 1500 is an electrical contact 1528, which is disposed within a bore 1526 (one of bores 1501 along top side 866). Electrical contacts 1403 and 1528 are electrically coupled via an electrical conductor 1404, one of electrical conductors 1405.

FIG. 15 shows a printed circuit board (PCB) 1510 which may be disposed within housing unit 102. Electrical circuitry 1517, including electronic component 1518, is disposed on PCB 1510 and is provided for performing telephone communication functions. An electrical connector 1512 having fingers 1514 is attached to PCB 1510. Electrical contacts 1515 are positioned on the ends of fingers 1514. Electrical contacts 1515 are electrically coupled to electrical circuitry 1517 via electrical conductors 1516.

As suggested by the dotted lines of FIG. 15, electrical connector 1512 inserts within notch 876 where fingers 1514 insert within bores 1401. When electrical connector 1512 and attachment wall 804 are positioned in this manner, each one of electrical contacts 1515 makes electrical contact with a respective one of electrical contacts 1400.

FIG. 16 shows a close-up of a portion of electrical connector 1512 which includes finger 1524, and a portion of attachment wall 804 which includes electrical contact 1403 disposed within bore 1402. Electrical contact 1403 comprises a conductive tip 1602 and a conductive spring 1604. Conductive tip 1602 is physically attached and electrically coupled to conductive spring 1604. Conductive spring 1604 is electrically coupled to electrical conductor 1404. Electrical contact 1520 is electrically coupled to electronic component 1518 via electrical conductor 1522 (one of electrical conductors 1516). When finger 1524 is inserted within bore 1402, electrical contact 1520 of finger 1524 makes physical contact with conductive tip 1602 and forces spring 1604 to compress. The physical contact and spring compression establish an electrical coupling between electrical contacts 1520 and 1602. Accordingly, an electrical connection is established between electronic component 1518 and electrical contact 1528.

FIG. 17 shows a cross section of housing unit 102 having PCB 1510 disposed therein and clamp 600 attached thereto. In FIG. 17, attachment wall 804 is inserted and attached within channel 702, and attachment wall 802 is positioned outside of housing unit 102. Top side 878 is exposed through opening 1217. PCB 1510, electrical connector 1512, fingers 1514, and attachment wall 804 are sized and positioned within housing unit 102 such that fingers 1514 are disposed within bores 1401. Electrical coupling is established between electrical circuitry 1517 and electrical contacts 1400, and therefore between electrical circuitry 1517 and electrical contacts 1500. When attachment wall 802 is inserted within a channel of housing unit 104, electrical contacts 1500 may be electrically coupled to electrical contacts and conductors disposed within housing unit 104.

Housing unit 104, of course, may also include a PCB having electrical circuitry disposed thereon. The PCB may include a similar electrical connector having fingers and electrical contacts. Attachment wall 802 may insert within a channel of housing unit 104 where electrical contacts 1500 make electrical contact with the electrical contacts disposed within housing unit 104, similar to that described above. Using clamp 600, electrical circuitry 1517 of housing unit 102 may be electrically coupled to the electrical circuitry of housing unit 104.

Enhanced safety is provided due to limited exposure to electrical circuitry since, for example, electrical connector 1512 is completely disposed within housing unit 102. Channel 702 has a width which is narrowly sized to inhibit a user from probing within housing unit 102, thereby lessening the risk that a user makes contact with electrical contacts 1515 and electrical circuitry 1517 and thus lessening the attendant risk of electrical shock. Where only one of attachment walls 802 and 804 is attached to a housing unit, additional safety is provided since electrical contacts 1400 and 1500 are disposed within bores 1401 and 1501 respectively.

While particular embodiments of the present invention have been shown and described, modifications may be made. It is therefore intended in the appended claims to cover all such changes and modifications which fall within the true spirit and scope of the invention.

What is claimed is:

1. A modular housing system, comprising:
    a first housing unit, said first housing unit having a first bottom wall, a first side wall, and a second side wall, said first housing unit defining a first channel located near said first side wall and having a first opening exposed on said first bottom wall, said first housing unit defining a second channel located near said second side wall and having a second opening exposed on said first bottom wall;
    a second housing unit, said second housing unit having a second bottom wall, a third side wall, and a fourth side wall, said second housing unit defining a third channel located near said third side wall and having a third opening exposed on said second bottom wall, said second housing unit defining a fourth channel located near said fourth side wall and having a fourth opening exposed on said second bottom wall; and
    a first clamp, said first clamp having a first base, a first attachment wall, and a second attachment wall, said first clamp providing a first option for attaching said first housing unit and said second housing unit where said first attachment wall is configured to insert within said first channel and said second attachment wall is configured to insert within said third channel, said first clamp providing a second option for attaching said first housing unit and said second housing unit where said first attachment wall is configured to insert within said second channel and said second attachment wall is configured to insert within said fourth channel.

2. The modular housing system according to claim 1, wherein the modular housing system includes electrical circuitry disposed therein providing telephone communication functions.

3. The modular housing system according to claim 1, further comprising:
    a third housing unit, said third housing unit having a third bottom wall and a fifth side wall, said third housing unit defining a fifth channel located near said fifth side wall and having a fifth opening exposed on said third bottom wall; and
    a second clamp, said second clamp having a second base, a third attachment wall, and a fourth attachment wall, said second clamp providing a third option for attaching said first and said third housing units where said third attachment wall is configured to insert within said first channel and said fourth attachment wall is configured to insert within said fifth channel.

4. The modular housing system according to claim 3, wherein said third housing unit further includes a sixth side wall and a sixth channel, said sixth channel located near said sixth side wall and having a sixth opening exposed on said third bottom wall, and wherein said second clamp provides a fourth option for attaching said first and said third housing units where said third attachment wall is configured to insert within said second channel and said fourth attachment wall is configured to insert within said sixth channel.

5. The modular housing system according to claim 1, wherein the modular housing system includes electrical circuitry disposed therein providing telephone communication functions.

6. The modular housing system according to claim 1, wherein said first housing unit includes at least a first electronic component disposed therein, said second housing unit includes at least a second electronic component disposed therein, and said first clamp includes electrical contacts and electrical conductors for electrically coupling said at least first and second electronic components.

7. The modular housing system according to claim 1, wherein said clamp includes at least a first end configured to inwardly flex to allow insertion of said first and said second attachment walls within said first and said second channels, respectively.

8. The modular housing system according to claim 7, wherein said clamp comprises a plastic material.

9. The modular housing system according to claim 7, wherein said clamp includes a button portion connected to said at least a first end, said button portion configured to inwardly flex said at least a first end upon depression.

10. The modular housing system according to claim 1, wherein said clamp includes at least a first end configured to inwardly and outwardly flex to allow insertion and attachment of said first and said second attachment walls within said first and said second channels, respectively.

11. The modular housing system according to claim 1, wherein said first bottom wall includes a first upper portion and a first lower portion, said first upper portion located adjacent to said first side wall and having said first opening exposed thereon, said first lower portion configured to support said first housing portion on a surface during use, and wherein said second bottom wall includes a second upper portion and a second lower portion, said second upper portion located adjacent to said second side wall and having said second opening exposed thereon, said second lower portion configured to support said second housing portion on the surface during use.

12. A clamp for attaching a first housing unit and a second housing unit, the first housing unit having a first bottom wall and a first side wall, the second housing unit having a second bottom wall and a second side wall, the first housing unit having a first channel integrally formed therein, the first channel located near the first side wall and having a first opening exposed on the first bottom wall, the second housing unit having a second channel integrally formed therein, the second channel located near the second side wall and having a second opening exposed on the second bottom wall, said clamp comprising:

a base;

a first attachment wall, said first attachment wall outwardly extending from said base, said first attachment wall configured to insertably attach within the first channel through the first opening; and a second attachment wall, said second attachment wall outwardly extending from said base and positioned substantially parallel to said first attachment wall, said second attachment wall configured to insertably attach within the second channel through the second opening.

13. The clamp according to claim 12, wherein the first housing unit further includes a third channel integrally formed therein and a third side wall, the second housing unit further includes a fourth channel integrally formed therein and a fourth side wall, the third channel located near the third side wall and including a third opening exposed on the first bottom wall, the fourth channel located near the fourth side wall and including a fourth opening exposed on the second bottom wall, and wherein said first attachment wall is configured to insertably attach within the third channel and said second attachment wall is configured to insertably attach within the fourth channel.

14. The clamp according to claim 12, wherein said clamp further includes at least a first end configured to flex to allow insertion of said first and second attachment walls within the first and the second channels, respectively.

15. The clamp according to claim 12, wherein said clamp further includes at least a first end configured to flex for insertion of said first and second attachment walls within the first and the second channels, respectively, said first attachment wall having a first end side and said second attachment wall having a second end side, said at least a first end including a first arm and a second arm, said first arm perpendicularly extending from said first end side and thereafter perpendicularly bending to run parallel to said first end side, said second arm perpendicularly extending from said second end side and thereafter perpendicularly bending to run parallel to said second end side.

16. The clamp according to claim 12, wherein the first housing unit includes at least a first electronic component disposed therein, the second housing unit includes at least a second electronic component disposed therein, and wherein said clamp further includes electrical contacts and electrical conductors configured for electrically coupling the at least first and second electronic components.

17. The clamp according to claim 12, wherein the first and the second housing units are included in a communication system.

18. The clamp according to claim 12, wherein said first attachment wall is sized to fit within the first channel and said second attachment wall is sized to fit within the second channel.

19. A first housing unit configured to provide optional attachments with a second housing unit via a clamp, said clamp defining a base, a first attachment wall, and a second attachment wall, said first housing unit comprising:

a bottom wall defining a first opening to a first channel and a second opening to a second channel, said first channel configured to receive at least one of the first and the second attachment walls of the clamp and said second channel configured to receive at least one of the first and the second attachment walls of the clamp.

20. The first housing unit according to claim 19, said first housing unit further comprising:

a first side wall, said first opening bordering said first side wall; and a second side wall, said second opening bordering said second side wall.

21. The first housing unit according to claim 20, wherein said first housing unit houses a base station and said second housing unit houses a handset unit, and where said base station and said handset unit are a part of a modular telephone system providing telephone communications.

22. The first housing unit according to claim 20, wherein said bottom wall includes an upper portion and a lower portion, said upper portion located adjacent to said first and said second side walls and having said first and said second openings exposed thereon, said lower portion configured to support said first housing portion on a surface during use.

23. A modular telephone system, comprising:

a base unit, said base unit defining a first bottom wall and a first channel, said first channel having a first opening exposed on said first bottom wall, said base unit including at least a first electronic component disposed therein;

an electrical cord, said electrical cord for conducting electrical power to said base unit and said at least a first electronic component;

a charging unit, said charging unit defining a second bottom wall and a second channel, said second channel having a second opening exposed on said second bottom wall, said charging unit including at least a second electronic component disposed therein;

a cordless handset, said cordless handset configured to be carried on said charging unit and including at least one battery disposed therein; and a clamp, said clamp including a first attachment wall and a second attachment wall, said first attachment wall configured to attach within said first channel and said second attachment wall configured to attach within said second channel for attaching said base unit and said charging unit, said clamp including electrical contacts and electrical conductors configured for electrically coupling said at least a first electronic component and said at least a second electronic component, said clamp conducting the electrical power from said base unit to said charging unit for charging said at least one battery when said cordless handset is carried on said charging unit.

24. The modular telephone housing system according to claim 23, wherein said clamp includes at least a first end configured to inwardly flex upon insertion within said first and said second channels and to outwardly flex for attachment within said first and said second channels.

* * * * *